United States Patent Office 3,773,862
Patented Nov. 20, 1973

3,773,862
PHOSPHONIC ACID DITHIOL ESTERS
Ernst Beriger, Neuallschwil, Switzerland, assignor to Ciba-Geigy AG, Basel, Switzerland
No Drawing. Filed Sept. 20, 1971, Ser. No. 182,126
Claims priority, application Switzerland, Sept. 28, 1970, 14,322/70
Int. Cl. C07f 9/40
U.S. Cl. 260—951                   1 Claim

ABSTRACT OF THE DISCLOSURE

The present invention describes new phosphonic acid dithiol esters, a method for their preparation, compositions containing them and a method for regulating the abscission of fruits by applying these new esters or compositions containing them to fruit trees, olive, nut trees, berry bushes and grapes. The new phosphonic acid esters correspond to the formula

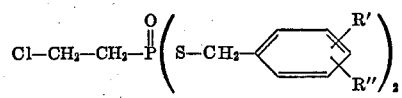

wherein R' is hydrogen, chlorine, —CF$_3$, —CN, methyl, ethyl, methoxy or ethoxy, R" is hydrogen, chlorine, methyl or methoxy.

---

The present invention relates to new phosphonic acid dithiol esters, their manufacture and their use for regulating the abscission of fruit.

In the present application, the term "regulating the abscission of fruit" is to be understood as meaning those intentional influences on a plant which bring about as simultaneous a ripening as possible of all fruit on the point of ripening, regardless of whether these influences are brought to bear externally or act via the metabolism of the plant. Particularly suitable fruit cultures in which the abscission of fruit can be regulated are apples, pears, cherries, damsons, peaches, apricots, olives, citrus fruit, nuts, and also berries, such as red currants, gooseberries, and grapes. It has been discovered that for this purpose esters of the formula

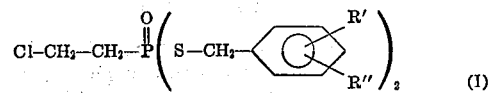

in which R' represents hydrogen, chlorine, —CF$_3$, —CN, methyl, ethyl, methoxy, ethoxy and R" represents hydrogen, chlorine, methyl or methoxy, possess particular advantages compared with known compounds.

2-chloroethylphosphonic acid has been described, for example, by Cook and Randall (Nature, vol. 218, page 974 (1968)) as an agent for stimulating the growth of plants and fruit abscission agent.

The activity of this compound and of further compounds derived from it by esterification is, however, unsatisfactory, because it is combined with undesirable side effects in the metabolism of the plant. In the case of fruit trees and shrubs not only is the ripening point of the fruit influenced by treatment, but also the flow of juice is excessively stimulated, resulting in resinosis. Furthermore, 2-chloroethylphosphonic acid possesses a strong defoliating activity, i.e. the desired fixing of the time of ripening is accompanied simultaneously by a highly undesirable leaf shedding in the treated plant.

It has now been surprisingly discovered that compounds of the Formula I accelerate the ripening and detaching of fruit substantially better without exhibiting any side effects of the kind mentioned. Generally speaking, only slight leaf shedding occurs, or none at all; and there is an almost complete absence of resinosis in fruit trees.

Particular importance attaches to the compound S,S-bis-(4'-chlorobenzyl)-2-chloroethylphosphone - dithioate, because it does not cause any additional stimulation of the resin flow in stone fruit which is strongly inclined to resinosis, such as cherry trees. With a warm-blooded toxicity higher than LD$_{50}$=2150 mg./kg. body weight (rat:oral), the compound may be considered as virtually non-poisonous.

The phosphonic acid dithiol esters of the Formula I can be manufactured by reacting one equivalent of a 2-chloroethane-phosphonic acid dihalide of the formula

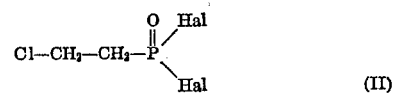

in which Hal represents halogen, in particular chlorine or bromine, with two equivalents of a substituted benzyl-mercaptan of the formula

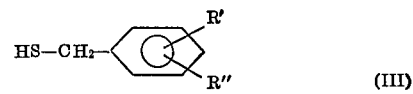

in which R' and R" have the meaning given for Formula I, preferably in the presence of an acid acceptor, such as a tertiary amine, an alkaline carbonate, alkali hydrogen carbonate, alkali lye, or alkali alcoholate, at temperatures from —10° C. to +30° C., preferably at 5° C. to 15° C.

As tertiary amines, particular mention may be made of triethylamine, trimethylamine, N,N-dimethylaniline or pyridine. Suitable acid acceptor alkali compounds are chiefly the sodium or potassium compounds, for example Na$_2$CO$_3$, K$_2$CO$_3$, NaHCO$_3$, NaOH, KOH, NaOC$_2$H$_5$.

The active substances of the Formula I can be used for regulating the abscission of fruit and improving the latex formation in hevea varieties as pure concentrate or together with suitable solid or liquid carriers and optionally further additives. Suitable carriers and additives are the substances conventionally used in formulation technique, such as natural or regenerated mineral substances, solvents, dispersants, wetting agents, adhesives, thickeners or binders.

The compounds of the Formula I are applied in the form of solutions, suspensions, microgranules or dusts. In general, the agents contain the active substances in concentrations from 0.1% to 95%, and when applied directly to plants, from about 0.01 to 0.3%. Solutions or suspensions are preferred.

To manufacture solutions solvents may be used, especially alcohols, for example ethanol or isopropanol; ketones, such as acetone or cyclohexanone; aliphatic hydrocarbons, such as kerosene, and cyclic hydrocarbons, such as benzene, toluene, xylene, tetrahydronaphthalene, alkylated naphthalenes; in addition, chlorinated hydrocarbons, such as tetrachloroethane, ethylene chloride; and finally, mineral and vegetable oils or mixtures of the above mentioned substances.

The aqueous preparations are dispersions. The active substances are homogenised in water by themselves or in one of the above mentioned solvents, preferably with the aid of dispersants. Suitable cationic dispersants are, for example, quaternary ammonium compounds; anionic dispersants are, for example, soaps, aliphatic long-chain sulphuric acid monoesters, aliphatic-aromatic sulphonic acids, long-chain alkoxyacetic acids; non-ionic dispersants are polyglycol ethers of fatty alcohols or alkylphenols with ethylene oxide. On the other hand, it is also possible to manufacture concentrates consisting of active substance, dispersant and, if desired, solvent. Such concentrates can be diluted before use, for example with water, and are then in the form of emulsions or suspensions.

Dusts can be manufactured by mixing or conjointly grinding the active substance with a solid carrier. Such solid carriers are, for example, talcum, diatomaceous earth, kaolin, bentonite, calcium carbonate, boric acid, tricalcium phosphate, also saw dust, cork powder, charcoal, and other materials of vegetable origin. The substances can also be deposited on the carrier with a volatile solvent. By adding wetting agents and protective colloids, wettable powders and pastes which are suspendible in water can be manufactured.

In many cases it is advantageous to apply granules to ensure a uniform release of active substances. These granules can be manufactured by dissolving the active substance in an organic solvent, absorbing the resulting solution by a granulated mineral, for example attapulgite or $SiO_2$ or porous plastic particles, for example urea-formaldehyde resin, and removing the solvent.

If when applying the active substances it is desired to bring about additional pesticidal activity, the β-chloroethylphosphonic acid dithiole esters of the Formula I can also be applied in combination with pesticides, chiefly insecticides, fungicides and bactericides, and, in certain cases too, with defoliants. In systematic application, that is to say when the active substances are absorbed from the soil through the roots of the plant and subsequently carried to the upper portions of the plant, it is possible to combine the active substances with herbicides in order to keep the area around the plant free from weeds.

Such substances which are suitable for pest control may belong, for example, to the class of the substituted phenylureas, the saturated or unsaturated halogeno fatty acids, halogenobenzonitriles, halobenzoic acids, phenoxycarboxylic acids, carbamates, triazines, nitroalkylphenols, organic phosphoric acid compounds, phenamidines, quaternary ammonium salts, sulphamic acids, arsenates, arsenites, borates or chlorates.

The following examples illustrate the invention.

Example 1

20.5 grams of triethylamine were added dropwise with stirring at 5°–15° C. to 18.5 g. of 2-chloroethane-phosphonic acid dichloride (B.P. 94–99° C. at 13 mm. Hg), 200 ml. of dry benzene and 31.9 g. of 4-chloro-benzylmercaptan. After 5 hours, the reaction mixture was dissolved in 100 ml. of water. The organic layer was washed successively with 30 ml. of N sodium hydroxide solution and 5 ml. of water and dried with $Na_2SO_4$. The solvent was evaporated in vacuo to yield the active substance of the formula

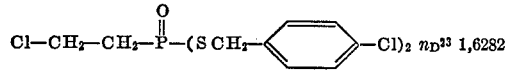 $n_D^{23}$ 1,6282

S.S.-bis - (4' - chlorobenzyl) - 2 - chloroethylphosphone-dithioate.

EXAMPLE 2

21 grams of triethylamine were added dropwise under anhydrous conditions at 5°–15° C. to a mixture of 18.5 g. of 2-chloroethane-phosphonic acid dichloride, 250 ml. of acetonitrile and 30.8 g. of 4-cyanobenzylmercaptan. The reaction mixture was stirred overnight, then treated with 200 ml. of water. The organic layer was isolated, washed with N sodium hydroxide solution and water and dried with $Na_2SO_4$. The acetonitrile was evaporated in vacuo to yield as residue S.S.-bis-(4' - cyanobenzyl) - 2-chloroethylphosphone-dithioate, $n_D^{27}$ 1,6332.

EXAMPLE 3

While cooling gently, 24.5 g. of N.N-dimethylanililine were added dropwise with stirring at 0–15° C. to a mixture of 18.5 g. of 2-chloroethane-phosphonic acid dichloride, 200 ml. of dry toluene and 27.6 g. of 4-methoxybenzylmercaptan. After 8 hours the precipitate which had formed was dissolved by adding 100 ml. of water. The upper toluene layer was washed with 30 ml. of N sodium hydroxide solution and approx. 15 ml. of water and concentrated by evaporation, to yield as residue S.S.-bis-(4'-methoxybenzyl)-2-chloroethylphosphone - dithioate, M.P. 58–60° C. (benzene/hexane).

EXAMPLE 4

18.5 grams of 2-chloroethane-phosphonic acid dichloride were added dropwise with stirring at 5–20° C. to a mixture of 27.6 g. of 2-methylbenzylmercaptan and 12 g. of $Na_2CO_3$ in 200 ml. of dry xylene. The mixture was stirred for approx. 6 hours and treated with 100 ml. of water. The xylene layer was isolated, washed with water until neutral, dried over anhydrous sodium sulphate and concentrated by evaporation to leave as residue 33.8 g. of S.S.-bis-(2' - methylbenzyl) - 2 - chloroethylphosphone-dithioate, $n_D^{27}$ 1,6127.

EXAMPLE 5

21 grams of triethylamine were added dropwise with stirring at 5–15° C. to a mixture of 18.5 g. of 2-chloroethane-phosphonic acid dichloride, 200 ml. of dry tetrahydrofuran and 32 g. of 3-trifluoromethylbenzylmercaptan. After 4 hours the reaction mixture was treated with 150 ml. of water, the tetrahydrofuran layer containing the final product isolated and washed twice with 30 ml. of N sodium hydroxide solution each time and subsequently four times with a total of 80 ml. of water. The organic layer was dried over anhydrous sodium sulphate and the tetrahydrofurane removed to yield 37.5 g. of S.S.-bis-(3'-trifluoromethylbenzyl)-2 - chloroethylphosphone-dithioate, $n_D^{26}$ 1,5416.

EXAMPLE 6

While cooling with ice water, 20.5 g. of triethylamine were added dropwise with stirring at 5–12° C. to a mixture of 18.5 g. of 2-chloroethane-phosphonic acid dichloride, 250 ml. of anhydrous diethyl ether and 38.8 g. of 2,4-dichlorobenzylmercaptan. After 5 hours the reaction mixture was treated with 100 ml. of water. The ether layer was isolated, washed with 5% soda solution and then with water until neutral and dried over anhydrous $CaCl_2$. The ether was stripped off in a water-jet vacuum to yield as residual oil S.S.-bis-(2',4'-dichlorobenzyl)-2 - chloroethylphosphone-dithioate, $n_D^{28}$ 1,6393.

EXAMPLE 7

20.5 grams of triethylamine were added dropwise at 5–15° C. to 18.5 g. of 2-chloroethane-phosphonic acid dichloride, 200 ml. of dry benzene and 24.8 g. of benzylmercaptan. After 5 hours the reaction mixture was treated with 100 ml. of water. The isolated organic layer was washed successively with 30 ml. of N sodium hydroxide solution and 5 ml. of water and dried over anhydrous $K_2CO_3$. The solvent was evaporated in vacuo to yield 34.1 g. of S.S.dibenzyl - 2 - chloroethylphosphone - dithioate, $n_D^{23}$ 1,6193.

EXAMPLE 8

Formulation

Dust: Equal parts of an active substance according to the invention and precipitated silica were finely ground. By mixing the resulting fine powder with kaolin or talcum, dusts having a preferred active substance content of 1–6% were obtained.

Wettable powder: To manufacture a wettable powder the following ingredients, for example, were mixed and finely ground:

70 parts of an active substance according to the invention
10 parts of highly adsorptive silica
15 parts of bolus alba (kaolin)
1.5 parts of sodium 1-benzyl-2-stearyl-benzimidazole-6,3'-disulphonate 3.5 parts of a reaction product of p-tert.-octylphenol and ethylene oxide.

Emulsion concentrate: Readily soluble active substances were also formulated as emulsion concentrate as follows:

50 parts of active substance
40 parts of xylene
10 parts of a mixture of calcium dodecylbenzenesulphonate and a reaction product of an alkylphenyl with ethylene oxide.

On dilution with water, stable, sprayable emulsions were obtained whose contents of active substance lay in the range between 50 and 0.001 percent by weight.

Granules: A solution of 7.5 g. of an active substance of the Formula I in 100 ml. of acetone was poured on 92 g. of granulated attapulgite. The whole was thoroughly mixed and the solvent stripped off in a rotary evaporator, to yield granules containing 7.5% of active substance.

EXAMPLE 9

Determination of the activity on the abscission of damsons and cherries

Aqueous preparations containing 500 p.p.m. of active substance were manufactured from emulsion concentrates of the active substances. Ten days before the fruit ripened, individual branches of damson and cherry trees were sprayed with these preparations, so that leaves and fruit were uniformly wetted. Ten days after the treatment, the quantity of fruit that had fallen in the meantime was counted on the treated and untreated branches. The plucking force required for the remaining fruit was determined using a spring balance. The resulting average values are as follows:

Cherries

|  | Fruit which has fallen after the time of treatment | Force required to detach the remaining fruit in percent of the control |
|---|---|---|
| Control | 7.4 | 100 |
| Active substance: |  |  |
| A | 9.7 | 13.8 |
| B | 4.3 | 13.6 |

Damsons

|  | Fruit which has fallen after the time of treatment | Force required to detach the remaining fruit in percent of the control |
|---|---|---|
| Control | 16.6 | 100 |
| Active substance: |  |  |
| A | 29.1 | 51.5 |
| B | 37.4 | 24.6 |

The treated trees had a healthy appearance. Also, injurious effects were not discovered later.

Explanation:

Active substance A: S.S.-dibenzyl-2-chloroethylphosphone-dithioate

Active substance B: S.S.-bis-(4'-chlorobenzyl)-2-chloroethylphosphone-dithioate.

EXAMPLE 10

Determination of the activity on the abscission of citrus fruit

Aqueous preparations containing 2000 p.p.m. and 1000 p.p.m. of active substance respectively were manufactured from emulsion concentrates of the active substances. The number of oranges on the point of ripening was determined on individual branchees of orange trees. These branches were afterwards sprayed uniformly with one of the preparations so that leaves and fruit were wetted. Seven days after the treatment the plucking force required for the ripened oranges on treated and untreated branches was measured. The following average values resulted:

|  | Concentration, p.p.m. | Reduction of the plucking force relative to the control, percent |
|---|---|---|
| Control |  | 100 |
| Active substance: |  |  |
| A | 2,000 | 94 |
|  | 1,000 | 94 |
| B | 2,000 | 52 |
|  | 1,000 | 67 |

What is claimed is:
1. The compound S.S.-bis-(4' - methoxybenzyl) - 2-chloroethylphosphone-dithioate.

References Cited

UNITED STATES PATENTS

| 3,094,405 | 6/1963 | Fon Toy et al. | 260—961 X |
| 3,185,721 | 5/1965 | Schrader | 260—961 X |
| 3,294,876 | 12/1966 | Regel | 260—961 X |

FOREIGN PATENTS

| 27,353 | 11/1968 | Japan | 260—961 |

OTHER REFERENCES

Shepeleva et al., Chemical Abstracts, vol. 51, pp. 4934–4935.

LEWIS GOTTS, Primary Examiner

R. L. RAYMOND, Assistant Examiner

U.S. Cl. X.R.

71—71, 87; 260—940, 955, 961, 972